(12) United States Patent
Wenqiang et al.

(10) Patent No.: US 12,113,169 B2
(45) Date of Patent: Oct. 8, 2024

(54) ELECTROCHEMICAL DEVICE AND ELECTRONIC DEVICE CONTAINING SAME

(71) Applicant: NINGDE AMEPEREX TECHNOLOGY LIMITED, Fujian (CN)

(72) Inventors: Li Wenqiang, Fujian (CN); Mingming Guan, Fujian (CN); Jianming Zheng, Fujian (CN); Xiangling Zheng, Fujian (CN)

(73) Assignee: NINGDE AMEPEREX TECHNOLOGY LIMITED, Ningde (CN)

( * ) Notice: Subject to any disclaimer, the term of this patent is extended or adjusted under 35 U.S.C. 154(b) by 767 days.

(21) Appl. No.: 17/281,881

(22) PCT Filed: Mar. 13, 2020

(86) PCT No.: PCT/CN2020/079264
§ 371 (c)(1),
(2) Date: Mar. 31, 2021

(87) PCT Pub. No.: WO2021/179300
PCT Pub. Date: Sep. 16, 2021

(65) Prior Publication Data
US 2022/0149431 A1  May 12, 2022

(51) Int. Cl.
*H01M 10/0567* (2010.01)
*H01M 10/0568* (2010.01)

(52) U.S. Cl.
CPC ... *H01M 10/0567* (2013.01); *H01M 10/0568* (2013.01); *H01M 2300/0025* (2013.01)

(58) Field of Classification Search
CPC ................................................ H01M 10/0567
See application file for complete search history.

(56) References Cited

U.S. PATENT DOCUMENTS

| | | | | |
|---|---|---|---|---|
| 2006/0024584 | A1* | 2/2006 | Kim | H01M 10/4235 429/231.95 |
| 2006/0147809 | A1 | 7/2006 | Khalil et al. | |
| 2012/0237836 | A1* | 9/2012 | Kim | H01M 10/0567 429/207 |
| 2017/0275311 | A1 | 9/2017 | Kotou et al. | |
| 2018/0151873 | A1* | 5/2018 | Matsuno | H01M 4/625 |
| 2018/0342758 | A1* | 11/2018 | Tang | H01M 4/1395 |

FOREIGN PATENT DOCUMENTS

| | | |
|---|---|---|
| CN | 1260849 | 6/2006 |
| CN | 102136602 A | 7/2011 |
| CN | 102386441 | 3/2012 |
| CN | 103078141 | 5/2013 |
| CN | 103268956 | 8/2013 |
| CN | 103887563 | 6/2014 |
| CN | 103928707 | 7/2014 |
| CN | 103972586 | 8/2014 |
| CN | 104466244 | 3/2015 |
| CN | 104979589 | 10/2015 |
| CN | 107394267 | 11/2017 |
| CN | 107394269 A | 11/2017 |
| CN | 107425179 | 12/2017 |
| CN | 108075188 | 5/2018 |
| CN | 108630989 | 10/2018 |
| CN | 108631010 | 10/2018 |
| CN | 108767314 | 11/2018 |

(Continued)

OTHER PUBLICATIONS

Li Wenqiang; Supplementary European Search Report for Application No. 20866935, filed Mar. 13, 2020; mailed Nov. 12, 2021; 4 pages.
Li, Wenqiang; Third Office Action for Chinese patent application No. 202010177667.4, filed Mar. 13, 2020, mailed Oct. 15, 2021, 10 pgs.
Li, Wenqiang; International Search Report and Written Opinion for PCT/CN2020/079264, filed Mar. 13, 2020, mailed Dec. 1, 2020, 10 pgs.
Li, Wenqiang; Office Action for Chinese patent application No. 202010177667.4, mailed Jan. 29, 2021, 9 pgs.
Wenqiang, Li, Office Action for Chinese patent application No. 202010177667.4, mailed Mar. 30, 2021, 8 pgs.

(Continued)

*Primary Examiner* — Maria Laios
*Assistant Examiner* — Jordan E Berresford
(74) *Attorney, Agent, or Firm* — Maier & Maier, PLLC

(57) ABSTRACT

An electrochemical device, including a positive electrode, a negative electrode and an electrolytic solution. The positive electrode includes a positive electrode current collector and a positive active material layer having a positive active material. The negative electrode includes a negative electrode current collector and a negative active material layer having a negative active material. The electrolytic solution includes a lithium ion and an anion represented by Formula I:

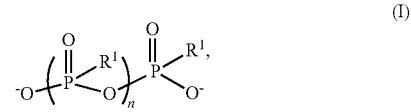

n is an integer in a range of 0 to 5; and
$R^1$ is selected from substituted or unsubstituted $C_1$-$C_{12}$ alkyls, substituted or unsubstituted $C_2$-$C_{12}$ alkenyls, substituted or unsubstituted $C_6$-$C_{20}$ aryls, and substituted or unsubstituted $C_1$-$C_{12}$ hydrocarbyloxys, wherein a substituent in the substitution is independently selected from a silyl, a siloxy, an amino group, an ether group, ester group, a carboxyl, a sulfonic acid group, a mercapto group, a cyano group, a halogen, or any combination thereof.

19 Claims, No Drawings

(56) References Cited

FOREIGN PATENT DOCUMENTS

| | | | | |
|---|---|---|---|---|
| CN | 109232653 A | * | 1/2019 | ............ C07F 9/6578 |
| CN | 109428118 | | 3/2019 | |
| CN | 109786834 A | | 5/2019 | |
| CN | 110048162 A | | 7/2019 | |
| CN | 110062976 A | | 7/2019 | |
| CN | 111342135 A | | 6/2020 | |
| EP | 3598559 | | 1/2020 | |
| JP | 2015018713 | | 1/2015 | |
| JP | 2016138080 | | 8/2016 | |
| JP | 2018133258 | | 8/2018 | |
| KR | 20170112122 | | 10/2017 | |

OTHER PUBLICATIONS

Office Action issued on Dec. 28, 2023, in corresponding Chinese Application No. 202210022579.6, 18 pages.

* cited by examiner

ELECTROCHEMICAL DEVICE AND ELECTRONIC DEVICE CONTAINING SAME

CROSS REFERENCE TO RELATED APPLICATIONS

The present application is a National Stage application of PCT international application: PCT/CN2020/079264, filed on 13 Mar. 2020, the disclosure of which is hereby incorporated by reference in its entirety.

TECHNICAL FIELD

This application relates to the technical field of energy storage, and in particular, to an electrochemical device and an electronic device containing same.

BACKGROUND

With the popularization and application of smart products, people's demand for electronic products such as a mobile phone, a notebook computer, and a camera is increasing every year. An electrochemical device serving as a power supply of the electronic products is increasingly important in our daily lives. By virtue of advantages such as a high specific energy, a high working voltage, a low self-discharge rate, a small size, and a light weight, lithium-ion batteries are widely applied in the field of consumer electronics.

However, with wide application of electrochemical devices in electric vehicles, mobile electronic devices, and unmanned aerial vehicles, people not only require an electrochemical device to work normally in normal temperature environments, but also require the electrochemical device to be safely applicable in harsh environments. For example, the following problems are urgent to solve: how to ensure that the electrochemical device can be used normally under extremely low temperature conditions without causing an instantaneous power failure of an electronic product, how to reduce risks of swelling of the electrochemical device under high temperature conditions and ensure safe use of the electronic product in high temperature environments, and how to implement charging and discharging of the electrochemical device at a high C-rate. In addition, in the prior art, the electrochemical performance of the electrochemical device in a high temperature environment is not ensured while an attempt is made to ensure the normal use of the electrochemical device in a low temperature environment. Therefore, people need to consider and solve the problem of how to make the electrochemical device achieve excellent electrochemical performance in both high temperature and low temperature environments.

SUMMARY

To solve at least the foregoing problems, this application introduces an anion containing a phosphoric anhydride functional group into an electrolytic solution of an electrochemical device. First, by using an electron-rich characteristic of a phosphorus oxygen double bond (P=O bond) in a phosphoric anhydride functional group, this application induces rapid transmission of lithium ions to improve rate performance of the electrochemical device and discharge performance of the electrochemical device under low-temperature conditions. Secondly, by using a bridging structure of the phosphoric anhydride functional group and a negative charge carried by the anion, this application helps to form a protective film in a fixed direction on a positive electrode, so as to improve cycle stability and high-temperature storage performance of the electrochemical device.

According to an aspect of this application, this application provides an electrochemical device, including: a positive electrode, where the positive electrode includes a positive electrode current collector and a positive active material layer, and the positive active material layer includes a positive active material; a negative electrode, where the negative electrode includes a negative electrode current collector and a negative active material layer, and the negative active material layer includes a negative active material; and an electrolytic solution, where the electrolytic solution includes a lithium ion and an anion represented by Formula I:

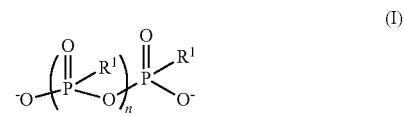

where n is an integer in a range of 0 to 5; and
$R^1$ is selected from substituted or unsubstituted $C_1$-$C_{12}$ alkyls, substituted or unsubstituted $C_2$-$C_{12}$ alkenyls, substituted or unsubstituted $C_6$-$C_{20}$ aryls, and substituted or unsubstituted $C_1$-$C_{12}$ hydrocarbyloxys, where a substituent in the substitution is independently selected from a silyl, a siloxy, an amino group, an ether group, ester group, a carboxyl, a sulfonic acid group, a mercapto group, a cyano group, a halogen, or any combination thereof.

According to an embodiment of this application, the anion represented by Formula I includes at least one of the following:

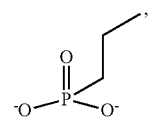
(I-1)

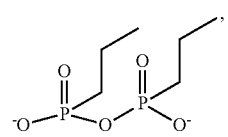
(I-2)

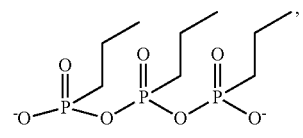
(I-3)

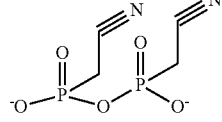
(I-4)

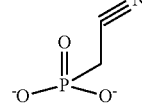
(I-5)

-continued

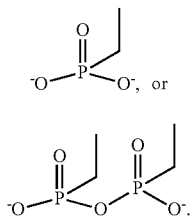

(I-6)

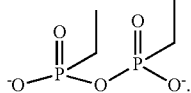

(I-7)

According to an embodiment of this application, based on the total weight of the electrolytic solution, the content of the anion represented by Formula I is 0.001%-7%.

According to an embodiment of this application, the electrolytic solution further includes one or more of a fluorocarbonate, a fluorocarboxylate, a sulfur-containing additive, a nitrile-containing additive, or a lithium salt additive.

According to an embodiment of this application, the fluorocarbonate includes at least one of 3,3,3-trifluoropropylene carbonate, fluoroethylene carbonate, 2,2,3,3-tetrafluoropropyl methyl carbonate, 2,2,3,3,3-pentafluoropropyl ethyl carbonate, bis(2,2,2-trifluoroethyl) carbonate, bis(2-fluoroethyl) carbonate, trifluoromethyl carbonate, or difluoroethylene carbonate.

According to an embodiment of this application, based on the total weight of the electrolytic solution, the content of the fluorocarbonates is 0.01% to 20%.

According to an embodiment of this application, the fluorocarboxylate includes at least one of acetyl hypofluorite; fluoroacetate-2-fluoroethyl, ethyl fluorohexanoate, methyl fluoroacetate, ethyl fluoroacetate, butyl fluoroacetate, trifluoroacetate-2,2,2-trifluoroethyl, 5-fluorohexanoate-2-fluoroethyl, difluoroacetate-2,2,2-trifluoroethyl, 2,2-difluoroethyl trifluoroacetate, 2-fluoroethyl 4-fluorobutyrate, ethyl trifluoropropionate, ethyl 2-fluoropropionate, ethyl 2,2-difluoropropionate, ethyl difluoropropionate, methyl difluoroacetate, or methyl 2-fluoropropionate.

According to an embodiment of this application, based on a total mass of the electrolytic solution, the content of the fluorocarboxylate is 0.01% to 30%.

According to an embodiment of this application, the sulfur-containing additive includes at least one of 1,3-butylidene sulfate, vinyl sulfate, 1,3-propane sultone, 1,3-propanediol cyclic sulfate, 2,4-butane sultone, 1,3-butane sultone, 1-methyl-1,3-propane sultone, 2-methyl-1,3-propane sultone, 3-methyl-1,3-propane sultone, 1-fluoro-1,3-propane sultone, 2-fluoro-1,3-propane sultone, or 3-fluoro-1,3-propane sultone.

According to an embodiment of this application, based on the total weight of the electrolytic solution, the content of the sulfur-containing additive is 0.01% to 10%.

According to an embodiment of this application, the nitrile-containing additive includes at least one of the following compounds:

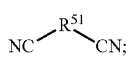

(II-A)

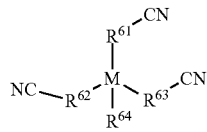

(II-B)

where M is selected from C or Si;
where $R^{51}$, $R^{61}$, $R^{62}$, $R^{63}$ are each independently selected from substituted or unsubstituted $C_1$-$C_{12}$ alkylidenes, substituted or unsubstituted $C_2$-$C_{12}$ alkenylenes, $R^0$—S—R groups, or $R^0$—O—R groups, where $R^0$ and R are each independently selected from substituted or unsubstituted $C_1$-$C_6$ alkylidenes; a substituent in the substitution is selected from halogens;
where $R^{64}$ is selected from H, substituted or unsubstituted $C_1$-$C_{12}$ alkylidenes, substituted or unsubstituted $C_2$-$C_{12}$ alkenylenes, $R^0$—S—R groups, or $R^0$—O—R groups, where $R^0$ and R are each independently selected from substituted or unsubstituted $C_1$-$C_6$ alkylidenes; a substituent in the substitution is selected from halogens.

According to an embodiment of this application, the nitrile-containing additive includes at least one of adiponitrile, succinonitrile, glutaronitrile, malononitrile, 2-methyl glutaronitrile, pimelic nitrile, sebaconitrile, azelanitrile, 1,4-dicyano-2-butene, ethylene glycol bis(propionitrile) ether, 3,3'-oxydipropionitrile, thiomalononitrile, hex-2-enedinitrile, butenedionitrile, 2-pentenedionitrile, ethylsuccinonitrile, hex-3-enedionitrile, 2-methyleneglutaronitrile, 4-cyanopimelonitrile, 1,3,6-hexane tricarbonitrile, 1,3,5-hexane tricarbonitrile, or 1,2,3-propane tricarbonitrile, or 1,2,3-tris(2-cyanooxy)propane.

According to an embodiment of this application, based on the total weight of the electrolytic solution, the content of the nitrile-containing additive is 0.01% to 10%.

According to an embodiment of this application, the lithium salt additive includes at least one of lithium bistrifluoromethanesulfonimide, lithium bis(fluorosulfonyl) imide, lithium bisoxalate borate, lithium tetrafluorophosphate oxalate, lithium difluorooxalate borate, lithium hexafluorocesium oxide, or lithium difluorophosphate.

According to an embodiment of this application, based on the total weight of the electrolytic solution, the content of the lithium salt additive is 0.01% to 5%.

According to an embodiment of this application, the negative active material layer includes a metal element, and the metal element includes at least one of Co, Mn, Ni, Al, or Cu.

According to an embodiment of this application, based on the total weight of the negative active material layer, the content of the metal element is lower than 200 ppm.

DETAILED DESCRIPTION OF EMBODIMENTS

Embodiments of this application will be described in detail below. The embodiments of this application shall not be construed as a limitation on this application.

The terms "include" "comprise" and "contain" used herein are open and mean including but without limitation.

The term "approximately" is intended to describe and represent small variations. When used with reference to an event or situation, the terms may denote an example in which the event or situation occurs exactly and an example in which the event or situation occurs very approximately. For example, when used together with a numerical value, the terms may represent a variation range less than or equal to ±10 wt % of the numerical value, such as less than or equal to ±5 wt %, less than or equal to ±4 wt %, less than or equal to ±3 wt %, less than or equal to ±2 wt %, less than or equal to ±1 wt %, less than or equal to ±0.5 wt %, less than or equal to ±0.1 wt %, or less than or equal to ±0.05 wt %. In addition, a quantity, a ratio, or another numerical value is sometimes expressed in a range format herein. Understandably, such a range format is for convenience and brevity, and shall be flexibly understood to include not only the numerical values explicitly specified and defined in the range, but also all individual numerical values or sub-ranges covered in the range as if each individual numerical value and each sub-range were explicitly specified.

The term "alkyl" covers linear and branched chain alkyl groups. For example, an alkyl may be a $C_1$-$C_{50}$ alkyl, a $C_1$-$C_{40}$ alkyl, a $C_1$-$C_{30}$ alkyl, a $C_1$-$C_{20}$ alkyl, a $C_1$-$C_{12}$ alkyl, a $C_1$-$C_{10}$ alkyl, a $C_1$-$C_6$ alkyl, a $C_2$-$C_6$ alkyl, or a $C_2$-$C_5$ alkyl. In some embodiments, the alkyls include methyl, ethyl, propyl, isopropyl, butyl, isobutyl, tert-butyl, pentyl, hexyl, heptyl, octyl, and the like. In addition, the alkyl group may be optionally replaced.

The term "alkenyl" covers linear and branched chain alkenyls. For example, the alkenyl may be a $C_2$-$C_{50}$ alkenyl, a $C_2$-$C_{40}$ alkenyl, a $C_2$-$C_{30}$ alkenyl, a $C_2$-$C_{20}$ alkenyl, a $C_2$-$C_{12}$ alkenyl, a $C_2$-$C_{10}$ alkenyl, or a $C_2$-$C_6$ alkenyl. In addition, the alkenyl may be optionally substituted.

The term "aryl group" covers a monocyclic system and a polycyclic ring system. Polycyclic may refer to two or more rings, of which two adjacent rings (which are "condensed") share two carbon atoms, at least one of which is aromatic, and the other of which may be, for example, a cycloalkyl group, a cycloalkenyl group, an aryl group, or a heterocyclic and/or heteroaryl group. For example, the aryl may be a $C_6$-$C_{50}$ aryl, a $C_6$-$C_{40}$ aryl, a $C_6$-$C_{30}$ aryl, a $C_6$-$C_{20}$ aryl, or a $C_6$-$C_{10}$ aryl. In addition, the aryl group may be optionally replaced.

The term "hydrocarbyloxy" is an organic group with —O—R, where R is a linear or branched chain hydrocarbyl. For example, R may be a $C_1$-$C_{50}$ hydrocarbyl, a $C_1$-$C_{40}$ hydrocarbyl, a $C_1$-$C_{30}$ hydrocarbyl, a $C_1$-$C_{20}$ hydrocarbyl, a $C_1$-$C_{12}$ hydrocarbyl, a $C_1$-$C_{10}$ hydrocarbyl, a $C_1$-$C_6$ hydrocarbyl, a $C_2$-$C_6$ hydrocarbyl, or a $C_2$-$C_5$ hydrocarbyl. For example, the hydrocarbyl may include an alkyl, an alkenyl, an alkynyl, or an aryl. In addition, the hydrocarbyloxy may be optionally substituted.

The term "alkylidene" covers linear and branched chain alkylidene groups. For example, the alkylidene may be a $C_1$-$C_{50}$ alkylidene, a $C_1$-$C_{40}$ alkylidene, a $C_1$-$C_{30}$ alkylidene, a $C_1$-$C_{20}$ alkylidene, a $C_1$-$C_{10}$ alkylidene, a $C_1$-$C_6$ alkylidene, a $C_2$-$C_6$ alkylidene, or a $C_2$-$C_5$ alkylidene. In addition, the alkylidene may be optionally substituted.

The term "alkenylene" covers linear and branched chain alkenylenes. For example, the alkenylene may be a $C_2$-$C_{50}$ alkenylene, a $C_2$-$C_{40}$ alkenylene, a $C_2$-$C_{30}$ alkenylene, a $C_2$-$C_{20}$ alkenylene, a $C_2$-$C_{10}$ alkenylene, a $C_1$-$C_6$ alkenylene, or a $C_2$-$C_6$ alkenylene. In addition, the alkenylene may be optionally substituted.

A substituent in the substitution may be independently selected from a silyl, a siloxy, an amino group, an ether group, ester group, a carboxyl, a sulfonic acid group, a mercapto group, a cyano group, a halogen, or any combination thereof.

This application relates to an electrochemical device, including: a positive electrode; a negative electrode; and an electrolytic solution.

In some embodiments, the positive electrode in this application may include a positive electrode current collector and a positive active material layer. In some embodiments, the positive active material layer is disposed on the positive current collector. In some embodiments, the positive active material layer includes a positive active material.

The positive active material in this application can reversibly intercalate and deintercalate lithium ions. Specific types of the positive-electrode active material are not limited, and may be selected according to needs. The positive active material may include lithium and at least one active metal, for example, may include but is not limited to a composite oxide that includes metallic lithium and at least one active metal. The active metal element includes or is selected from at least one of the following elements: cobalt (Co), nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), and zirconium (Zr).

In some embodiments, the positive active material may include but is not limited to at least one of lithium cobalt oxide, lithium iron phosphate, lithium iron manganese phosphate, sodium iron phosphate, lithium vanadium phosphate, sodium vanadium phosphate, lithium vanadyl phosphate, sodium vanadyl phosphate, lithium vanadium oxide, lithium manganese oxide, lithium nickel oxide, lithium nickel cobalt manganese oxide, lithium-rich manganese-based material, lithium nickel cobalt aluminum oxide, and lithium titanium oxide.

The positive electrode current collector may be a positive electrode current collector commonly used in the art, and, in some embodiments, may include but is not limited to an aluminum foil or a nickel foil.

In some embodiments, the positive active material layer may further include a binder and/or a conductive agent.

The binder improves bonding between particles of the positive active material, and also improves bonding between the positive active material and the positive current collector. In some embodiments, the binder may include but is not limited to at least one of: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, styrene-butadiene rubber, acrylic styrene-butadiene rubber, epoxy resin, or nylon.

The conductive agent may be used to enhance conductivity of the electrode. This application may use any conductive material as the conductive agent, as long as the conductive material does not cause unwanted chemical changes. In some embodiments, the conductive material may include but is not limited to at least one of a carbon-based material (for example, natural graphite, artificial graphite, carbon black, acetylene black, Ketjen black, and carbon fiber), a metal-based material (for example, metal powder, metal fiber, including copper, nickel, aluminum, silver, and the like), a conductive polymer (for example, a polyphenylene derivative), and any mixture thereof.

The negative electrode of the electrochemical device in this application may include a negative electrode current collector and a negative active material layer. In some embodiments, the negative active material layer is disposed on the negative current collector. In some embodiments, the negative active material layer includes a negative active material.

The negative active material in this application can reversibly intercalate and deintercalate lithium ions. Specific types of the negative active material are not limited, and may be selected as required. In some embodiments, the negative active material may include or be selected from one or more of the following materials: a carbonaceous material, a siliceous material, an alloy material, and a composite oxide material containing lithium metal. In some embodiments, the carbonaceous material may include but is not limited to crystalline carbon, non-crystalline carbon, and a mixture thereof. The crystalline carbon may be amorphous or flake-shaped, mini-flake-shaped, spherical or fibrous natural graphite or artificial graphite. The non-crystalline carbon may be soft carbon, hard carbon, mesophase pitch carbide, calcined coke, and the like.

In some embodiments, the negative active material may include but is not limited to at least one of natural graphite, artificial graphite, mesocarbon microbead (MCMB for short), hard carbon, soft carbon, silicon, a silicon-carbon composite, a Li—Sn alloy, a Li—Sn—O alloy, Sn, SnO, $SnO_2$, spinel-structured lithiated $TiO_2$—$Li_4Ti_5O_{12}$, and a Li—Al alloy.

The negative electrode current collector may be a negative electrode current collector commonly used in the art. In some embodiments, the negative electrode current collector includes but is not limited to a copper foil, a nickel foil, a stainless steel foil, a titanium foil, foamed nickel, foamed copper, a polymer substrate coated with a conductive metal, or any combination thereof.

In some embodiments, the negative active material layer may further include a binder and/or a conductive agent. The binder and the conductive agent may be made from the materials disclosed in the foregoing description of the positive electrode, details of which are omitted here.

The electrolytic solution in this application may be classed into aqueous electrolytic solutions and nonaqueous electrolytic solutions. In contrast with an aqueous electrolytic solution, an electrochemical device that adopts a nonaqueous electrolytic solution can operate in a wider voltage window, thereby achieving a higher energy density.

The nonaqueous electrolytic solution may include an organic solvent. The organic solvent according to this application may be any organic solvent known in the prior art and suitable for use as a solvent of the electrolytic solution. In some embodiments, the organic solvent according to this application includes or is selected from at least one of: ethylene carbonate (EC), propylene carbonate (PC), diethyl carbonate (DEC), ethyl methyl carbonate (EMC), or dimethyl carbonate (DMC).

Based on a lot of research, it is found in this application that when the electrolytic solution contains a lithium ion and an anion represented by the following Formula I, the electrochemical device achieves excellent cycle stability, and achieves both excellent low-temperature discharge performance and high-temperature storage performance:

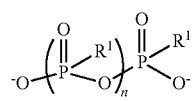
(I)

where n is an integer in a range of 0 to 5; and $R^1$ is selected from substituted or unsubstituted alkyls, substituted or unsubstituted alkenyls, substituted or unsubstituted aryls, and substituted or unsubstituted hydrocarbyloxys, where a substituent in the substitution is independently selected from a silyl, a siloxy, an amino group, an ether group, ester group, a carboxyl, a sulfonic acid group, a mercapto group, a cyano group, a halogen, or any combination thereof.

In some embodiments, $R^1$ is selected from substituted or unsubstituted $C_1$-$C_{12}$ alkyls, substituted or unsubstituted $C_2$-$C_{12}$ alkenyls, substituted or unsubstituted $C_6$-$C_{20}$ aryls, or substituted or unsubstituted $C_1$-$C_{12}$ hydrocarbyloxys.

In some embodiments, $R^1$ is selected from substituted or unsubstituted $C_1$-$C_{10}$ alkyls, substituted or unsubstituted $C_2$-$C_{10}$ alkenyls, substituted or unsubstituted $C_6$-$C_{10}$ aryls, or substituted or unsubstituted $C_1$-$C_{10}$ hydrocarbyloxys.

Although the detailed reasons for accomplishing such effects are not clear, the following factors may be considered: the anions represented by Formula I in this application not only induce rapid transmission of the lithium ions at the interface between the positive electrode and the electrolytic solution to improve the discharge performance of the electrochemical device at low temperatures; but also help to form a stable passivation film in a fixed direction on the surface of the positive electrode to improve the cycle stability of the electrochemical device during the charge and discharge cycles, reduce gas generation and the expansion rate under high-temperature storage conditions, and improve the high-temperature storage performance of the electrochemical device.

In some embodiments, the anion represented by Formula I described in this application includes or is selected from, but without limitation, one or more of the following anions:

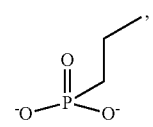
(I-1)

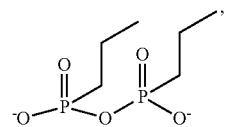
(I-2)

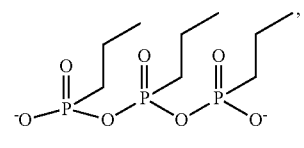
(I-3)

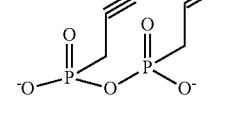
(I-4)

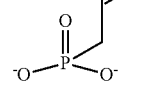
(I-5)

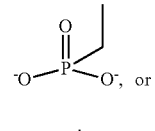
(I-6), or

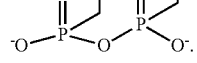
(I-7)

In some embodiments, based on the total weight of the electrolytic solution, the content of the anion represented by Formula I is: 0.001 wt %-7 wt %, 0.01 wt %-5 wt %, 0.1 wt %-3 wt %, or 0.1 wt %-2 wt %. In some embodiments, based on the total weight of the electrolytic solution, the content of the anion represented by Formula I is any value within the foregoing ranges. For example, the content of the anion represented by Formula I is approximately 0.001 wt %, approximately 0.01 wt %, approximately 0.1 wt %, approximately 1 wt %, approximately 2 wt %, approximately 3 wt %, approximately 4 wt %, approximately 5 wt %, approximately 6 wt %, or approximately 7 wt %.

In some embodiments, the anion represented by Formula I in this application reacts with the lithium ion to form a lithium salt, and is added to the electrolytic solution in the form of the lithium salt.

In some embodiments, the anion represented by Formula I in this application may be a decomposition product of 1-propyl phosphoric anhydride, 1-acetonitrile phosphoric anhydride, or 1-ethyl phosphoric anhydride.

In some embodiments, the electrolytic solution in this application optionally further includes one or more of a fluorocarbonate, a fluorocarboxylate, a sulfur-containing additive, a nitrile-containing additive, and a lithium salt additive, so as to combine with the anion in Formula I to induce the electrolytic solution to exert better effects in the electrochemical device. The following describes in detail the foregoing components and the content and effects thereof.

In some embodiments, the electrolytic solution in this application further includes fluorocarbonate. The fluorocarbonate combines with the anion in Formula I in the electrolytic solution to enable rapid transmission of the lithium ions at the interface between the positive electrode and the negative electrode, and also accomplish the stability of the positive electrode and the negative electrode during charging and discharging, so as to improve the cycle performance and the low-temperature discharge performance of the electrochemical device.

In some embodiments, the fluorocarbonate includes or is selected from at least one of 3,3,3-trifluoropropylene carbonate, fluoroethylene carbonate, 2,2,3,3-tetrafluoropropyl methyl carbonate, 2,2,3,3,3-pentafluoropropyl ethyl carbonate, bis(2,2,2-trifluoroethyl) carbonate, bis(2-fluoroethyl) carbonate, trifluoromethyl carbonate, or difluoroethylene carbonate.

In some embodiments, based on the total weight of the electrolytic solution, the content of the fluorocarbonate is 0.01 wt %-40 wt %, 0.01 wt %-30 wt %, 0.01 wt %-20 wt %, 0.01 wt %-10 wt % %, 0.01 wt %-5 wt %, 0.1 wt %-40 wt %, 0.1 wt %-30 wt %, 0.1 wt %-20 wt %, 0.1 wt %-10 wt %, 0.1 wt %-5 wt %, 1 wt %-40 wt %, 1 wt %-30 wt %, 1 wt %-20 wt %, 1 wt %-10 wt %, or 1 wt %-5 wt %.

In some embodiments, the electrolytic solution in this application further includes fluorocarboxylate. The fluorocarboxylate interacts with the anion in Formula I to further improve the high-temperature storage performance. Although the detailed reasons for such effects are not clear, the following factors may be considered: the interaction between the fluorocarboxylate and the anion in formula I improves the oxidation resistance of the electrolytic solution, and can effectively reduce the extent to which the positive active material oxidizes the electrolytic solution. In addition, a composite SEI film can be formed on the surface of the positive electrode to enhance protection for the positive electrode.

In some embodiments, the fluorocarboxylate includes or is selected from at least one of acetyl hypofluorite; fluoroacetate-2-fluoroethyl, ethyl fluorohexanoate, methyl fluoroacetate, ethyl fluoroacetate, butyl fluoroacetate, trifluoroacetate-2,2,2-trifluoroethyl, 5-fluorohexanoate-2-fluoroethyl, difluoroacetate-2,2,2-trifluoroethyl, 2,2-difluoroethyl trifluoroacetate, 2-fluoroethyl 4-fluorobutyrate, ethyl trifluoropropionate, ethyl 2-fluoropropionate, ethyl 2,2-difluoropropionate, ethyl difluoropropionate, methyl difluoroacetate, or methyl 2-fluoropropionate.

In some embodiments, based on the total weight of the electrolytic solution, the content of the fluorocarboxylate is 0.01 wt %-50 wt %, 0.01 wt %-40 wt % 0.01 wt %-30 wt %, 0.01 wt %-20 wt %, 0.01 wt %-10 wt % %, 0.01 wt %-5 wt %, 0.1 wt %-50 wt %, 0.1 wt %-40 wt %, 0.1 wt %-30 wt %, 0.1 wt %-20 wt %, 0.1 wt %-10 wt %, 0.1 wt %-5 wt %, 1 wt %-50 wt %, 1 wt %-40 wt %, 1 wt %-30 wt %, 1 wt %-20 wt %, 1 wt %-10 wt %, or 1 wt %-5 wt %.

In some embodiments, the electrolytic solution in this application further includes a sulfur-containing additive. The sulfur-containing additive can also form a stable SEI film on the surface of the positive electrode to protect the positive electrode. Combined with the anion represented by Formula I in this application, the sulfur-containing additive can form a composite protective film on the surface of the positive electrode, thereby further strengthening the protection for the positive electrode and improving the stability of the electrochemical device.

In some embodiments, the sulfur-containing additive includes at least one of 1,3-butylidene sulfate, vinyl sulfate, 1,3-propane sultone, 1,3-propanediol cyclic sulfate, 2,4-butane sultone, 1,3-butane sultone, 1-methyl-1,3-propane sultone, 2-methyl-1,3-propane sultone, 3-methyl-1,3-propane sultone, 1-fluoro-1,3-propane sultone, 2-fluoro-1,3-propane sultone, or 3-fluoro-1,3-propane sultone.

In some embodiments, based on the total weight of the electrolytic solution, the content of the sulfur-containing additive is 0.01 wt %-20 wt %, 0.01 wt %-10 wt % %, 0.01 wt %-5 wt %, 0.1 wt %-20 wt %, 0.1 wt %-10 wt %, 0.1 wt %-5 wt %, 1 wt %-20 wt %, 1 wt %-10 wt %, or 1 wt %-5 wt %.

In some embodiments, the electrolytic solution in this application further includes a nitrile-containing additive. The nitrile-containing additive includes a cyano (—CN) functional group. The nitrile-containing additive interacts with the anion represented by Formula I to form an excellent nitrile protective film on the surface of the positive electrode to well stabilize the active metal in the positive active material, suppress the dissolution of the active metal, and improve the cycle performance of the electrochemical device.

In some embodiments, the nitrile-containing additive includes at least one of the following compounds:

(II-A)

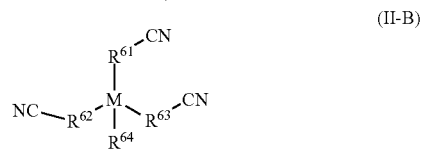

(II-B)

where the element M may be selected from C or Si;
$R^{51}$, $R^{61}$, $R^{62}$, $R^{63}$ are each independently selected from substituted or unsubstituted $C_1$-$C_{12}$ alkylidenes, substituted or unsubstituted $C_2$-$C_{12}$ alkenylenes, $R^0$—S—R groups, or R⁰—O—R groups, where R⁰ and R are each independently selected from substituted or unsubstituted $C_1$-$C_6$ alkylidenes; a substituent in the substitution is selected from halogens;

$R^{64}$ is selected from H, substituted or unsubstituted $C_1$-$C_{12}$ alkylidenes, substituted or unsubstituted $C_2$-$C_{12}$ alkenylenes, R⁰—S—R groups, or R⁰—O—R groups, where R⁰ and R each are independently selected from substituted or unsubstituted $C_1$-$C_6$ alkylidenes; a substituent in the substitution is selected from halogens. In some embodiments, the nitrile-containing additive includes at least one of adiponitrile, succinonitrile, glutaronitrile, malononitrile, 2-methyl glutaronitrile, pimelic nitrile, sebaconitrile, azelanitrile, 1,4-dicyano-2-butene, ethylene glycol bis(propionitrile) ether, 3,3'-oxydipropionitrile, thiomalononitrile, hex-2-enedinitrile, butenedionitrile, 2-pentenedionitrile, ethylsuccinonitrile, hex-3-enedionitrile, 2-methyleneglutaronitrile, 4-cyanopimelonitrile, 1,3,6-hexane tricarbonitrile, 1,3,5-hexane tricarbonitrile, or 1,2,3-propane tricarbonitrile, or 1,2,3-tris(2-cyanooxy)propane.

The protective effects of the nitrile-containing additive is related to the dosage thereof to some extent. In some embodiments, based on the total weight of the electrolytic solution, the content of the nitrile-containing additive is 0.01 wt %-20 wt %, 0.01 wt %-10 wt % %, 0.1 wt %-20 wt %, 0.1 wt %-10 wt %, 1 wt %-20 wt %, or 1 wt %-10 wt %.

In some embodiments, LiF can enhance the stability of the SEI film. Therefore, the electrolytic solution in this application may further include a lithium salt additive capable of increasing the LiF component in the SEI film, so as to achieve the effect of improving the cycle stability of the electrochemical device.

In some embodiments, the lithium salt additive includes or is selected from at least one of: lithium bistrifluoromethanesulfonimide $LiN(CF_3SO_2)_2$ (LiTFSI for short), lithium bis(fluorosulfonyl)imide $Li(N(SO_2F)_2)$ (LiFSI for short), lithium bis(oxalate) borate $LiB(C_2O_4)_2$ (LiBOB for short), lithium tetrafluorophosphate oxalate ($LiPF_4C_2O_2$), lithium difluoro(oxalate) borate $LiBF2(C_2O_4)$ (LiDFOB for short), lithium hexafluorocesium oxide ($LiCsF_6$), or lithium difluorophosphate ($LiPO_2F_2$).

In some embodiments, based on the total weight of the electrolytic solution, the content of the lithium salt additive is 0.01 wt %-20 wt %, 0.01 wt %-10 wt % %, 0.01 wt %-5 wt %, 0.01 wt %-3 wt %, 0.1 wt %-20 wt %, 0.1 wt %-10 wt %, 0.1 wt %-5 wt %, 0.1 wt %-3 wt %, 1 wt %-20 wt %, 1 wt %-10 wt %, 1 wt %-5 wt %, or 1 wt %-3 wt %.

In some embodiments, the surface of the negative active material layer of the electrochemical device contains a trace amount of metal elements. In some embodiments, the metal elements are distributed on the surface of the negative active material layer. For example, based on the surface of the negative electrode (on the side away from the negative current collector), the distribution depth of the metal elements is not greater than 5 mm. A part of the metal elements on the surface of the negative active material layer are derived from the metal elements in the positive active material, and another part thereof is derived from the electrolyte system. For example, after the electrolytic solution is injected, the metal elements distributed on the surface of the negative active material layer can be adjusted through adjustment of the high-temperature baking time of the electrolytic solution and the water content in the dry battery. In addition, in the process of charging and discharging the electrochemical device, the electrolytic solution chemically reacts with the positive active material to some extent, so that the metal in the positive active material is dissolved in the electrolytic solution in the form of ions. During the charging, the dissolved metal ions are reduced and deposited on the surface of the negative active material layer of the electrochemical device.

A part of the metal elements on the surface of the negative active material layer are derived from the positive active material. Therefore, in some embodiments of this application, the metal elements may include or be selected from at least one of cobalt (Co), nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), and zirconium (Zr).

In this application, the anion represented by Formula I and contained in the electrolytic solution helps to form a firm and stable SEI film on the surface of the positive electrode to protect the positive active material. Therefore, the metal elements dissolved out of the positive active material and distributed to the surface of the negative electrode are generally a trace amount of elements. In addition, the content of the metal ions added into the electrolytic solution is also tiny. In some embodiments, based on the total weight of the negative active material layer, the range of the content of the metal elements is lower than approximately 200 ppm.

In fact, the trace amount of metal elements distributed on the surface of the negative electrode enhance the conductivity of the surface of the negative electrode to some extent. This is conducive to the rapid transmission of electrons and lithium ions, and therefore, improves the rate performance and the low-temperature discharge performance of the electrochemical device.

In some embodiments, the electrochemical device according to this application further includes a separator disposed between the positive electrode and the negative electrode to prevent short circuit. The material and the shape of the separator used in the electrochemical device in this application are not particularly limited, and may be any material and shape disclosed in the prior art. In some embodiments, the separator includes a polymer or an inorganic compound or the like formed from a material that is stable to the electrolytic solution according to this application.

In some embodiments, the separator may include a substrate layer and a surface treatment layer. The substrate layer is a non-woven fabric, film, or composite film, which, in each case, have a porous structure. The material of the substrate layer may include or be selected from at least one of polyethylene, polypropylene, polyethylene terephthalate, and polyimide. Specifically, the material of the substrate layer may be a polyethylene porous film, a polypropylene porous film, a polyethylene non-woven fabric, a polypropylene non-woven fabric, or a polypropylene-polyethylene-polypropylene porous composite film.

The surface treatment layer may be, but is not limited to, a polymer layer, an inorganic compound layer, or a hybrid layer of a polymer and an inorganic compound.

The inorganic compound layer may include inorganic particles and a binder. The inorganic particles may include or be selected from a combination of one or more of an aluminum oxide, a silicon oxide, a magnesium oxide, a titanium oxide, a hafnium dioxide, a tin oxide, a ceria, a nickel oxide, a zinc oxide, a calcium oxide, a zirconium oxide, an yttrium oxide, a silicon carbide, a boehmite, an aluminum hydroxide, a magnesium hydroxide, a calcium hydroxide, and a barium sulfate. The binder may include or be selected from a combination of one or more of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a poly methyl methacrylate, a polytetrafluoroethylene, and a polyhexafluoropropylene.

The polymer layer may include a polymer. The material of the polymer may include or be selected from at least one of a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

A person skilled in the art understands that the electrochemical device according to this application may be a lithium-ion battery or any other appropriate electrochemical device. To the extent not departing from the content disclosed herein, the electrochemical device according the embodiments of this application includes any device in which an electrochemical reaction occurs. Specific examples of the electrochemical device include all kinds of primary batteries, secondary batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery.

The electrochemical device according to this application may be used for any purposes not particularly limited, and may be used for any purposes known in the prior art. According to some embodiments of this application, the electrochemical device according to this application may be used to make an electronic device. The electronic device includes, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following further describes the technical solutions of this application with reference to comparative embodiments and specific embodiments, but this application is not limited to such embodiments. A person skilled in the art understands that the preparation method described herein is merely exemplary. Any modification or equivalent replacement made to the technical solutions of this application without departing from the scope of the technical solutions of this application shall fall within the protection scope of this application.

EMBODIMENTS

The following describes methods for preparing lithium-ion batteries and methods for testing performance of the lithium-ion batteries according to the embodiments and comparative embodiments of this application.

(i) Preparing a Lithium-Ion Battery (1) Preparing an electrolytic solution: in an argon atmosphere glovebox in which the water content is less than 10 ppm, evenly mixing ethylene carbonate (EC), diethyl carbonate (DEC), and propylene carbonate (PC) at a mass ratio of 3:4:3, dissolving fully dried lithium salt $LiPF_6$ in the foregoing nonaqueous solvent to obtain a basic electrolytic solution, in which the content of $LiPF_6$ is 1 mol/L; and finally, adding additives into the basic electrolytic solution to prepare the electrolytic solution described in the embodiments, where the mass ratio of the additives is shown in Tables 1-8 below.

(2) Preparing a positive electrode: mixing lithium cobalt oxide ($LiCoO_2$) as a positive active material, acetylene black as a conductive agent, and polyvinylidene fluoride (PVDF) as a binder at a weight ratio of 96:2:2, fully stirring the mixture in an appropriate amount of N-methylpyrrolidone (NMP) solvent to form a homogeneous positive electrode slurry, coating the positive electrode slurry onto an aluminum foil of the positive current collector, performing drying and cold calendering to obtain a positive active material layer, and then performing cutting and tab welding to obtain a positive electrode.

(3) Preparing a negative electrode: mixing graphite as a negative active material, styrene butadiene rubber (SBR) as a binder, and sodium carboxymethyl cellulose (CMC) as a thickener at a weight ratio of 97:2:1, fully stirring and evenly mixing them in deionized water to make a homogeneous negative electrode slurry; coating the copper foil of the negative electrode current collector with the negative slurry, performing drying and cold calendering to obtain a negative active material layer, and performing cutting and tab welding to obtain a negative electrode.

(4) Separator: using a polyethylene (PE) porous polymer film as a separator.

(5) Preparing a lithium-ion battery: stacking the positive electrode, the separator, and the negative electrode sequentially, placing the separator between the positive electrode and the negative electrode to serve a separation function, winding them and placing them into an outer package foil for drying, and injecting the electrolytic solution prepared above, and performing steps such as vacuum packaging, standing, chemical formation, and reshaping to complete preparing the lithium-ion battery.

(II) Methods for Testing the Lithium-Ion Battery (1) Low-Temperature Discharge Test Discharging the lithium-ion battery at a temperature of 25° C. and a current of 0.5 C until the voltage reaches 3.0 V, leaving the battery to stand for 5 minutes, charging the battery at a current of 0.5 C until the voltage reaches 4.45 V, and then charging the battery at a constant voltage of 4.45 V until the current reaches 0.05 C; similarly, discharging the battery at a temperature of 25° C. and a current of 0.2 C until the voltage reaches 3.0V, and recording a discharge capacity at this time as C1;

charging the lithium-ion battery at a temperature of 25° C. and a current of 0.5 C until the voltage reaches 4.45 V, and then charging the battery at a constant voltage of 4.45 V until the current reaches 0.05 C; leaving the lithium-ion battery to stand under a temperature of −20° C. for 30 minutes so that the temperature of the lithium-ion battery is the same as the outside temperature; discharging the battery at a temperature of −20° C. and a current of 0.2 C until the voltage reaches 3.0V, and recording a discharge capacity at this time as C2; and measuring the low-temperature discharge performance of the lithium-ion battery by calculating the discharge percentage of the lithium-ion battery under a −20° C. condition according to the following formula: (C2/C1)×100%.

(2) Test of an Expansion Rate of the Battery Under High-Temperature Storage

Discharging the lithium-ion battery at a temperature of 25° C. and a current of 0.5 C until the voltage reaches 3.0 V, and leaving the battery to stand for 5 minutes; charging the battery at a current of 0.5 C until the voltage reaches 4.45 V, charging the battery at a constant voltage of 4.45 V until the current reaches 0.05 C, using a PPG pouch-type cell thickness gauge to measure the thickness of the fully charged lithium-ion battery, and recording the measured thickness value as a; storing the lithium-ion battery in an 80° C. oven for 8 hours, measuring the thickness after the 8-hour storage, and recording the measured thickness value as b; and using the following formula to calculate the thickness expansion rate of the lithium-ion battery under an 80° C. condition to measure the high-temperature storage performance of the lithium-ion battery: $(b-a)/a \times 100\%$.

(3) Cycle Test Under a 25° C. Condition

Discharging the lithium-ion battery at a temperature of 25° C. and a current of 0.5 C until the voltage reaches 3.0 V, and leaving the battery to stand for 5 minutes; charging the battery at a current of 0.5 C until the voltage reaches 4.45 V, and then charging the battery at a constant voltage of 4.45 V until the current reaches 0.05 C; after completion of the charging, discharging the battery at a current of 0.5 C until the voltage reaches 3.0 V, thereby completing a charge and discharge cycle (that is, the battery has cycled for one cycle); and cycling the battery at 25° C. for 800 cycles according to the foregoing charge and discharge process, with the discharge capacity after the first cycle being recorded as C1, and the discharge capacity after the $800^{th}$ cycle being recorded as C800; and calculating the cycle capacity retention rate of the lithium-ion battery under a 25° C. condition according to the following formula to measure the cycle performance of the lithium-ion battery: $(C800/C1) \times 100\%$.

(4) Cycle Test Under a 45° C. Condition

Discharging the lithium-ion battery at a temperature of 45° C. and a current of 0.5 C until the voltage reaches 3.0 V, and leaving the battery to stand for 5 minutes; charging the battery at a current of 0.5 C until the voltage reaches 4.45 V, and then charging the battery at a constant voltage of 4.45 V until the current reaches 0.05 C; after completion of the charging, discharging the battery at a current of 0.5 C until the voltage reaches 3.0 V, thereby completing a charge and discharge cycle (that is, the battery has cycled for one cycle); and cycling the battery at 45° C. for 500 cycles according to the foregoing charge and discharge process, with the discharge capacity after the first cycle being recorded as C1, and the discharge capacity after the $500^{th}$ cycle being recorded as C500; and calculating the cycle capacity retention rate of the lithium-ion battery under a 45° C. condition according to the following formula to measure the cycle performance of the lithium-ion battery under a high-temperature condition: $(C500/C1) \times 100\%$.

(5) Metal Element Test

Discharging the lithium-ion battery at a current of 0.5 C until the voltage reaches 3.0 V, leaving the battery to stand for 5 minutes, and continuing to discharge the battery at a current of 0.05 C until the voltage reaches 2.8 V; disassembling the discharged lithium-ion battery in a glovebox, use a small amount of dimethyl carbonate (DMC) solvent to rinse the surface of the negative electrode for 2 to 3 times to remove the residual electrolytic solution on the surface of the negative electrode, air-drying the negative electrode plate, and then leaving a middle area of the negative electrode to undergo an inductively coupled plasma (ICP) test to measure the content of the metal elements in the negative electrode.

Embodiments 1-19 and Comparative Embodiment 1

The electrolytic solution and the lithium-ion batteries described in Embodiments 1-19 and Comparative Embodiment 1 are prepared according to the foregoing preparation methods. In Comparative Embodiment 1, the basic electrolytic solution is applied. In Embodiments 1-19, the components shown in Table 1 are added into the basic electrolytic solution according to the listed content, where the content is the mass percent of each component based on the total weight of the electrolytic solution, and the substances represented by Formulas I-2, I-3, I-4, and I-7 are added in the form of lithium salts. In addition, Table 1 also shows the electrochemical test results of the lithium-ion batteries described in Embodiments 1-19 and Comparative Embodiment 1.

TABLE 1

| | Anion represented by Formula I | | | | Discharge percentage under −20° C. | Thickness expansion rate after storage under 80° C. for 8 h |
|---|---|---|---|---|---|---|
| | Formula I-2 | Formula I-3 | Formula I-4 | Formula I-7 | | |
| Embodiment 1 | 0.01 wt % | | | | 35.0% | 8.0% |
| Embodiment 2 | 0.1 wt % | | | | 36.0% | 7.5% |
| Embodiment 3 | 0.2 wt % | | | | 37.0% | 7.0% |
| Embodiment 4 | 0.3 wt % | | | | 38.0% | 6.5% |
| Embodiment 5 | 0.5 wt % | | | | 40.5% | 6.0% |
| Embodiment 6 | 1 wt % | | | | 40.4% | 6.1% |
| Embodiment 7 | 3 wt % | | | | 40.5% | 5.9% |
| Embodiment 8 | 5 wt % | | | | 36.0% | 7.5% |
| Embodiment 9 | | 0.2 wt % | | | 37.1% | 6.9% |
| Embodiment 10 | | 0.5 wt % | | | 40.4% | 5.9% |
| Embodiment 11 | | 5 wt % | | | 35.9% | 7.4% |
| Embodiment 12 | | | 0.1 wt % | | 36.1% | 7.4% |
| Embodiment 13 | | | 0.2 wt % | | 36.9% | 7.0% |
| Embodiment 14 | | | 0.3 wt % | | 37.9% | 6.5% |
| Embodiment 15 | | | 0.5 wt % | | 40.5% | 5.9% |
| Embodiment 16 | | | 5 wt % | | 36.1% | 7.5% |
| Embodiment 17 | | | | 0.2 wt % | 37.0% | 7.0% |

TABLE 1-continued

| | Anion represented by Formula I | | | | Discharge | Thickness expansion rate after storage |
|---|---|---|---|---|---|---|
| | Formula I-2 | Formula I-3 | Formula I-4 | Formula I-7 | percentage under −20° C. | under 80° C. for 8 h |
| Embodiment 18 | | | | 0.5 wt % | 40.6% | 6.0% |
| Embodiment 19 | | | | 5 wt % | 36.0% | 7.5% |
| Comparative Embodiment 1 | | | | | 30.0% | 15.0% |

The electrochemical test results in Table 1 show that, in contrast with Comparative Embodiment 1, the electrolytic solution in Embodiments 1-19 of this application contains a specific content of the anion represented by Formula I according to this application, and therefore, the discharge performance of the obtained electrochemical device under a low-temperature condition and the storage performance of the electrochemical device under a high-temperature condition have been significantly improved. To be specific, by introducing the anion represented by Formula I into the electrolytic solution, the obtained electrochemical device exhibits excellent electrochemical performance under both low-temperature conditions and high-temperature conditions.

The reasons for the improvement of the low-temperature discharge performance are: the P=O bond contained in the anion represented by Formula I has electron-rich characteristics. Therefore, even at a temperature as low as −20° C., the anion can still accelerate transfer and transmission of the lithium ions at the interface of the positive electrode.

The reasons for the improvement of the high-temperature storage performance are: the anion represented by Formula I helps to form a firm and stable SEI film on the surface of the positive electrode to well protect the positive active material and the positive electrode, so that the electrochemical device will not severely generate gases or expand even if stored at a high temperature of 80° C. for a long period.

Embodiment 5 and Embodiments 20-26

Embodiments 20-26 make improvements on the basis of Embodiment 5. Specifically, in Embodiments 20-26, fluorocarbonate is further added into the electrolytic solution described in Embodiment 5. The specific components and content added and the performance test results of the obtained lithium-ion battery are shown in Table 2 below.

The electrochemical test results in Table 2 show that, in contrast with Embodiment 5, the electrolytic solution in Embodiments 20-26 of this application contains a specific content of fluorocarbonate, and therefore, the discharge performance of the obtained electrochemical device under a low temperature and the cycle stability of the electrochemical device under a normal temperature have been improved to some extent. That is because the anion represented by Formula I interacts with the fluorocarbonate to make the electrolytic solution have a relatively high reduction potential, so that the SEI film can be formed on the surface of the negative electrode in advance to protect the negative active material and improve the cycle performance of the electrochemical device. In addition, the formed SEI film helps to decrease side reactions at the interface of the negative electrode. Therefore, the increase of resistance caused by the accumulation of by-products on the electrode surface arising from the side reactions is suppressed, and rapid transmission of the lithium ions at the interface of the negative electrode is induced, and therefore, the discharge performance of the electrochemical device under a low temperature is improved.

Embodiment 5 and Embodiments 27-33

Embodiments 27-33 make improvements on the basis of Embodiment 5. Specifically, in Embodiments 27-33, fluorocarboxylate is further added into the electrolytic solution described in Embodiment 5. The specific components and content added and the performance test results of the obtained lithium-ion battery are shown in Table 3 below.

TABLE 2

| Embodiment | Formula I-2 | Fluorocarbonate | | Discharge percentage under −20° C. | Capacity retention rate after cycling at 25° C. for 800 cycles |
|---|---|---|---|---|---|
| | | Fluoroethylene carbonate | Difluoroethylene carbonate | | |
| Embodiment 5 | 0.5 wt % | | | 40.5% | 85.0% |
| Embodiment 20 | 0.5 wt % | 3 wt % | | 40.6% | 86.0% |
| Embodiment 21 | 0.5 wt % | 7 wt % | | 41.0% | 91.0% |
| Embodiment 22 | 0.5 wt % | 10 wt % | | 42.0% | 91.2% |
| Embodiment 23 | 0.5 wt % | 20 wt % | | 43.0% | 90.5% |
| Embodiment 24 | 0.5 wt % | | 3 wt % | 40.7% | 86.1% |
| Embodiment 25 | 0.5 wt % | | 7 wt % | 41.2% | 90.1% |
| Embodiment 26 | 0.5 wt % | | 10 wt % | 42.2% | 91.3% |

TABLE 3

| Embodiment | Formula I-2 | Fluorocarboxylate Ethyl fluoro-acetate | Fluorocarboxylate Methyl fluoro-acetate | Thickness expansion rate after storage under 80° C. for 8 h |
|---|---|---|---|---|
| Embodiment 5 | 0.5 wt % | | | 6.00% |
| Embodiment 27 | 0.5 wt % | 2 wt % | | 5.50% |
| Embodiment 28 | 0.5 wt % | 5 wt % | | 5.40% |
| Embodiment 29 | 0.5 wt % | 10 wt % | | 5.00% |
| Embodiment 30 | 0.5 wt % | 30 wt % | | 5.20% |
| Embodiment 31 | 0.5 wt % | | 5 wt % | 5.30% |
| Embodiment 32 | 0.5 wt % | | 10 wt % | 4.90% |
| Embodiment 33 | 0.5 wt % | | 20 wt % | 5.10% |

The electrochemical test results in Table 3 show that, in contrast with Embodiment 5, the electrolytic solution in Embodiments 27-33 of this application contains a specific content of fluorocarboxylate, and therefore, the expansion rate of the obtained electrochemical device is further reduced after the electrochemical device is stored under a high temperature of 80° C. for 8 hours. That is because the anion represented by Formula I interacts with the fluorocarboxylate to improve the oxidation resistance of the electrolytic solution, so as to effectively resist the oxidation of the positive active material and reduce gas generation. In addition, the fluorocarboxylate can form a composite SEI film on the surface of the positive electrode to further strengthen the protection for the positive electrode and further suppress gas generation and expansion.

Embodiment 5 and Embodiments 34-41

Embodiments 34-41 make improvements on the basis of Embodiment 5. Specifically, in Embodiments 34-41, a sulfur-containing additive is further added into the electrolytic solution described in Embodiment 5. The specific components and content added and the performance test results of the obtained lithium-ion battery are shown in Table 4 below.

The electrochemical test results in Table 4 show that, in contrast with Embodiment 5, the electrolytic solution in Embodiments 34-41 of this application contains a specific content of sulfur-containing additive, and therefore, the expansion rate of the obtained electrochemical device is further reduced after the electrochemical device is stored under a high temperature of 80° C. for 8 hours. That is because the sulfur-containing additive can also form a stable SEI film on the surface of the positive electrode, and interact with the anion represented by Formula I of this application to form a composite protective film on the surface of the positive electrode to further strengthen the protection for the positive electrode and suppress gas generation and expansion.

TABLE 4

| Embodiment | Formula I-2 | Sulfur-containing additive 1,3-propane sultone | Sulfur-containing additive 3-methyl-1,3-propane sultone | Thickness expansion rate after storage under 80° C. for 8 h |
|---|---|---|---|---|
| Embodiment 5 | 0.5 wt % | | | 6.00% |
| Embodiment 34 | 0.5 wt % | | 0.5 wt % | 5.60% |
| Embodiment 35 | 0.5 wt % | | 1 wt % | 5.50% |
| Embodiment 36 | 0.5 wt % | | 3 wt % | 5.00% |
| Embodiment 37 | 0.5 wt % | | 5 wt % | 4.70% |
| Embodiment 38 | 0.5 wt % | | 10 wt % | 4.50% |
| Embodiment 39 | 0.5 wt % | 0.5 wt % | | 5.50% |
| Embodiment 40 | 0.5 wt % | 3 wt % | | 4.90% |
| Embodiment 41 | 0.5 wt % | 5 wt % | | 4.60% |

Embodiment 5 and Embodiments 42-63

Embodiments 42-63 make improvements on the basis of Embodiment 5. Specifically, in Embodiments 42-63, a nitrile-containing additive is further added into the electrolytic solution described in Embodiment 5. The specific components and content added and the performance test results of the obtained lithium-ion battery are shown in Table 5 below.

TABLE 5

| Embodiment | Formula I-2 | Nitrile-containing additive Malononitrile | Adiponitrile | Ethylene glycol bis(propionitrile) ether | 1,3,6-hexane tricarbonitrile | 1,2,3-tris(2-cyanooxy)propane | Capacity retention rate after cycling at 45° C. for 500 cycles |
|---|---|---|---|---|---|---|---|
| Embodiment 5 | 0.5 wt % | | | | | | 85.00% |
| Embodiment 42 | 0.5 wt % | 1 wt % | | | | | 86.00% |
| Embodiment 43 | 0.5 wt % | 3 wt % | | | | | 86.50% |
| Embodiment 44 | 0.5 wt % | 5 wt % | | | | | 87.00% |
| Embodiment 45 | 0.5 wt % | 7 wt % | | | | | 87.30% |
| Embodiment 46 | 0.5 wt % | 10 wt % | | | | | 87.20% |
| Embodiment 47 | 0.5 wt % | | 3 wt % | | | | 86.60% |
| Embodiment 48 | 0.5 wt % | | 7 wt % | | | | 87.20% |
| Embodiment 49 | 0.5 wt % | | | 0.5 wt % | | | 85.50% |
| Embodiment 50 | 0.5 wt % | | | 1 wt % | | | 86.50% |
| Embodiment 51 | 0.5 wt % | | | 3 wt % | | | 88.00% |
| Embodiment 52 | 0.5 wt % | | | 5 wt % | | | 87.90% |
| Embodiment 53 | 0.5 wt % | | | 7 wt % | | | 87.10% |
| Embodiment 54 | 0.5 wt % | | | | 0.5 wt % | | 86.00% |
| Embodiment 55 | 0.5 wt % | | | | 1 wt % | | 87.00% |
| Embodiment 56 | 0.5 wt % | | | | 3 wt % | | 88.50% |
| Embodiment 57 | 0.5 wt % | | | | 5 wt % | | 88.40% |

TABLE 5-continued

| Embodiment | Formula I-2 | Malononitrile | Adiponitrile | Ethylene glycol bis(propionitrile) ether | 1,3,6-hexane tricarbonitrile | 1,2,3-tris(2-cyanooxy)propane | Capacity retention rate after cycling at 45° C. for 500 cycles |
|---|---|---|---|---|---|---|---|
| Embodiment 58 | 0.5 wt % | | | | 7 wt % | | 87.30% |
| Embodiment 59 | 0.5 wt % | | | | | 0.5 wt % | 86.40% |
| Embodiment 60 | 0.5 wt % | | | | | 1 wt % | 87.30% |
| Embodiment 61 | 0.5 wt % | | | | | 3 wt % | 88.80% |
| Embodiment 62 | 0.5 wt % | | | | | 5 wt % | 88.60% |
| Embodiment 63 | 0.5 wt % | | | | | 7 wt % | 87.40% |

The electrochemical test results in Table 5 show that, in contrast with Embodiment 5, the electrolytic solution in Embodiments 42-63 of this application contains a specific content of nitrile-containing additive, and therefore, the cycle performance of the obtained electrochemical device at a relatively high temperature of 45° C. is further improved. That is because the nitrile-containing additive can form an excellent nitrile protective film on the surface of the positive electrode to improve the stability of the positive electrode material during charging and discharging. In addition, the nitrile-containing additive can well stabilize the active metal in the positive active material, suppress the dissolution of the active metal, and improve the cycle performance of the electrochemical device.

Embodiment 5 and Embodiments 64-73

Embodiments 64-73 make improvements on the basis of Embodiment 5. Specifically, in Embodiments 64-73, a lithium salt additive is further added into the electrolytic solution described in Embodiment 5. The specific components and content added and the performance test results of the obtained lithium-ion battery are shown in Table 6 below.

TABLE 6

| Embodiment | Formula I-2 | Lithium salt LiBOB | Lithium salt LiDFOP | Discharge percentage under −20° C. | Capacity retention rate after cycling at 45° C. for 500 cycles |
|---|---|---|---|---|---|
| Embodiment 5 | 0.5 wt % | | | 40.50% | 85.00% |
| Embodiment 64 | 0.5 wt % | 0.1 wt % | | 40.40% | 87.10% |
| Embodiment 65 | 0.5 wt % | 0.3 wt % | | 40.20% | 89.10% |
| Embodiment 66 | 0.5 wt % | 0.5 wt % | | 40.00% | 90.00% |
| Embodiment 67 | 0.5 wt % | 1 wt % | | 39.90% | 91.20% |
| Embodiment 68 | 0.5 wt % | 2 wt % | | 39.50% | 92.00% |
| Embodiment 69 | 0.5 wt % | | 0.1 wt % | 40.60% | 85.50% |
| Embodiment 70 | 0.5 wt % | | 0.3 wt % | 40.70% | 88.00% |
| Embodiment 71 | 0.5 wt % | | 0.5 wt % | 40.10% | 89.90% |
| Embodiment 72 | 0.5 wt % | | 1 wt % | 39.80% | 91.20% |
| Embodiment 73 | 0.5 wt % | | 2 wt % | 39.50% | 92.30% |

The electrochemical test results in Table 6 show that, in contrast with Embodiment 5, the low-temperature discharge performance of the electrochemical device described in Embodiments 64-73 of this application is deteriorated slightly, but the cycle stability of the electrochemical device under a high temperature is further improved. That is because the added lithium salt additive can increase the LiF component in the SEI film to enhance the stability of the SEI film and achieve the effect of improving the cycle stability of the electrochemical device.

Embodiment 5 and Embodiments 74-78

Embodiments 74-78 make improvements on the basis of Embodiment 5. Specifically, the water content of the battery before injection of the electrolytic solution is controlled to be 80 ppm, 100 ppm, 140 ppm, 200 ppm, 240 ppm, and 270 ppm respectively by setting the high-temperature baking time, thereby obtaining Embodiment 5 and Embodiments 74-78 shown in Table 7, respectively. In contrast with Embodiment 5, a specific content of metallic cobalt element exists at a depth of not more than 10 μm on the surface of the negative electrode described in Embodiments 74-78. The specific content and the performance test results of the obtained lithium-ion battery are shown in Table 7 below.

TABLE 7

| Embodiment | Formula I-2 | Metal on the surface the negative electrode (Co/ppm) | Discharge percentage under −20° C. |
|---|---|---|---|
| Embodiment 5 | 0.5 wt % | 2 | 40.50% |
| Embodiment 74 | 0.5 wt % | 5 | 40.60% |
| Embodiment 75 | 0.5 wt % | 10 | 41.00% |
| Embodiment 76 | 0.5 wt % | 50 | 44.00% |

TABLE 7-continued

| Embodiment | Formula I-2 | Metal on the surface the negative electrode (Co/ppm) | Discharge percentage under −20° C. |
|---|---|---|---|
| Embodiment 77 | 0.5 wt % | 70 | 44.50% |
| Embodiment 78 | 0.5 wt % | 100 | 45.00% |

The electrochemical test results in Table 7 show that, in contrast with Embodiment 5, a higher content of the cobalt element is distributed on the surface of the negative electrode described in Embodiments 74-78 of this application, and therefore, the discharge performance of the obtained electrochemical device under a low temperature is further improved. That is because the metal element distributed on the surface of the negative electrode enhances the conductivity of the surface of the negative electrode to some extent, thereby being conducive to the rapid transmission of electrons and lithium ions and improving the low-temperature discharge performance of the electrochemical device.

Embodiment 21 and Embodiments 79-84

In Embodiments 79-84, a sulfur-containing additive, a fluorocarboxylate, nitrile-containing additive or a combination thereof is added on the basis of Embodiment 21. The specific components and content added and the performance test results of the obtained lithium-ion battery are shown in Table 8-1 and Table 8-2 below.

TABLE 8-1

| Embodiment | Formula I-2 | Fluoroethylene carbonate | 3-methyl-1,3-propane sultone | Ethyl fluoro acetate | Malononitrile | Ethylene glycol bis(propionitrile) ether | 1,3,6-hexane tricarbonitrile |
|---|---|---|---|---|---|---|---|
| Embodiment 21 | 0.5 wt % | 7 wt % | | | | | |
| Embodiment 79 | 0.5 wt % | 7 wt % | 3 wt % | | | | |
| Embodiment 80 | 0.5 wt % | 7 wt % | | 5 wt % | | | |
| Embodiment 81 | 0.5 wt % | 7 wt % | | | 3 wt % | | |
| Embodiment 82 | 0.5 wt % | 7 wt % | | | | 1 wt % | |
| Embodiment 83 | 0.5 wt % | 7 wt % | | | | | 1 wt % |
| Embodiment 84 | 0.5 wt % | 7 wt % | 3 wt % | | 3 wt % | 1 wt % | |

TABLE 8-2

| Embodiment | Discharge percentage under −20° C. | Thickness expansion rate after storage under 80° C. for 8 h | Capacity retention rate after cycling at 25° C. for 800 cycles | Capacity retention rate after cycling at 45° C. for 500 cycles |
|---|---|---|---|---|
| Embodiment 21 | 41.0% | 7.0% | 91.0% | 85.9% |
| Embodiment 79 | 40.2% | 6.0% | 91.2% | 86.5% |
| Embodiment 80 | 40.1% | 6.1% | 91.5% | 85.7% |
| Embodiment 81 | 40.2% | 5.9% | 91.0% | 86.5% |
| Embodiment 82 | 40.5% | 5.5% | 91.1% | 87.5% |
| Embodiment 83 | 40.0% | 5.0% | 91.0% | 88.0% |
| Embodiment 84 | 40.0% | 4.0% | 91.2% | 88.0% |

The electrochemical test results in Table 8-1 and Table 8-2 show that, by using a combination of additives described in this application, this application obtains an electrochemical device of excellent low-temperature discharge performance and high-temperature storage performance. The electrochemical device can exhibit excellent cycle performance under both normal temperatures and relatively high temperatures.

References to "embodiments", "some embodiments", "an embodiment", "another example", "example", "specific example" or "some examples" throughout the specification mean that at least one embodiment or example in this application includes specific features, structures, materials, or characteristics described in the embodiment(s) or example(s). Therefore, descriptions throughout the specification, which make references by using expressions such as "in some embodiments", "in an embodiment", "in one embodiment", "in another example", "in an example", "in a specific example", or "example", do not necessarily refer to the same embodiment(s) or example(s) in this application. In addition, specific features, structures, materials, or characteristics herein may be combined in one or more embodiments or examples in any appropriate manner.

Although illustrative embodiments have been demonstrated and described above, a person skilled in the art understands that the above embodiments shall not be construed as a limitation on this application, and changes, replacements, and modifications may be made to the embodiments without departing from the spirit, principles, and scope of this application.

What is claimed is:

1. An electrochemical device, comprising:
a positive electrode, wherein the positive electrode comprises a positive electrode current collector and a positive active material layer, and the positive active material layer comprises a positive active material;
a negative electrode, wherein the negative electrode comprises a negative electrode current collector and a negative active material layer, and the negative active material layer comprises a negative active material; and
an electrolytic solution, wherein the electrolytic solution comprises a lithium ion and an anion represented by Formula I:

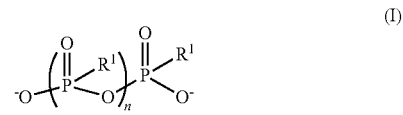

(I)

wherein
n is an integer in a range of 0 to 5; and
$R^1$ is selected from substituted or unsubstituted $C_1$-$C_{12}$ alkyls, substituted or unsubstituted $C_2$-$C_{12}$ alkenyls, substituted or unsubstituted $C_6$-$C_{20}$ aryls, and substituted or unsubstituted $C_1$-$C_{12}$ hydrocarbyloxys, wherein a substituent in the substitution is independently selected from a silyl, a siloxy, an amino group, an ether group, ester group, a carboxyl, a sulfonic acid group, a mercapto group, a cyano group, a halogen, or any combination thereof;

wherein, based on a total mass of the electrolytic solution, a content of the anion represented by Formula I is 2%-7%.

2. The electrochemical device according to claim 1, wherein the anion represented by Formula I comprises at least one of the following:

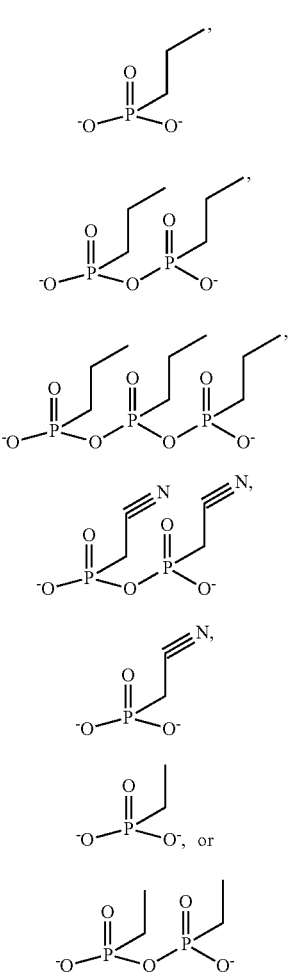

3. The electrochemical device according to claim 1, wherein the electrolytic solution further comprises one or more of a fluorocarbonate, a fluorocarboxylate, a sulfur-containing additive, a nitrile-containing additive, or a lithium salt additive.

4. The electrochemical device according to claim 3, wherein the electrolytic solution further comprises the fluorocarbonate; the fluorocarbonate comprises at least one of 3,3,3-trifluoropropylene carbonate, fluoroethylene carbonate, 2,2,3,3-tetrafluoropropyl methyl carbonate, 2,2,3,3,3-pentafluoropropyl ethyl carbonate, bis(2,2,2-trifluoroethyl) carbonate, bis(2-fluoroethyl) carbonate, trifluoromethyl carbonate, or difluoroethylene carbonate.

5. The electrochemical device according to claim 3, wherein the electrolytic solution further comprises the fluorocarboxylate; the fluorocarboxylate comprises at least one of acetyl hypofluorite, fluoroacetate-2-fluoroethyl, ethyl fluorohexanoate, methyl fluoroacetate, ethyl fluoroacetate, butyl fluoroacetate, trifluoroacetate-2,2,2-trifluoroethyl, 5-fluorohexanoate-2-fluoroethyl, difluoroacetate-2,2,2-trifluoroethyl, 2,2-difluoroethyl trifluoroacetate, 2-fluoroethyl 4-fluorobutyrate, ethyl trifluoropropionate, ethyl 2-fluoropropionate, ethyl 2,2-difluoropropionate, ethyl difluoropropionate, methyl difluoroacetate, or methyl 2-fluoropropionate.

6. The electrochemical device according to claim 3, wherein the electrolytic solution further comprises the sulfur-containing additive; the sulfur-containing additive comprises at least one of 1,3-butylidene sulfate, vinyl sulfate, 1,3-propane sultone, 1,3-propanediol cyclic sulfate, 2,4-butane sultone, 1,3-butane sultone, 1-methyl-1,3-propane sultone, 2-methyl-1,3-propane sultone, 3-methyl-1,3-propane sultone, 1-fluoro-1,3-propane sultone, 2-fluoro-1,3-propane sultone, or 3-fluoro-1,3-propane sultone.

7. The electrochemical device according to claim 3, wherein the electrolytic solution further comprises the nitrile-containing additive; the nitrile-containing additive comprises at least one of the following compounds:

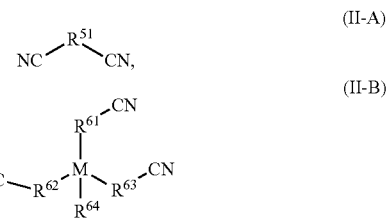

wherein M is selected from C or Si;

wherein $R^{51}$, $R^{61}$, $R^{62}$, $R^{63}$ are each independently selected from substituted or unsubstituted $C_1$-$C_{12}$ alkylidenes, substituted or unsubstituted $C_2$-$C_{12}$ alkenylenes, $R^0$—S—R groups, or $R^0$—O—R groups, wherein $R^0$ and R are each independently selected from substituted or unsubstituted $C_1$-$C_6$ alkylidenes; a substituent in the substitution is selected from halogens;

wherein $R^{64}$ is selected from H, substituted or unsubstituted $C_1$-$C_{12}$ alkylidenes, substituted or unsubstituted $C_2$-$C_{12}$ alkenylenes, $R^0$—S—R groups, or $R^0$—O—R groups, wherein $R^0$ and R each are independently selected from substituted or unsubstituted $C_1$-$C_6$ alkylidenes; a substituent in the substitution is selected from halogens.

8. The electrochemical device according to claim 3, wherein the electrolytic solution further comprises the nitrile-containing additive; the nitrile-containing additive comprises at least one of adiponitrile, succinonitrile, glutaronitrile, malononitrile, 2-methyl glutaronitrile, pimelic nitrile, sebaconitrile, azelanitrile, 1,4-dicyano-2-butene, ethylene glycol bis(propionitrile) ether, 3,3'-oxydipropionitrile, thiomalononitrile, hex-2-enedinitrile, butenedionitrile, 2-pentenedionitrile, ethylsuccinonitrile, hex-3-enedionitrile, 2-methyleneglutaronitrile, 4-cyanopimelonitrile, 1,3,6-hexane tricarbonitrile, 1,3,5-hexane tricarbonitrile, or 1,2,3-propane tricarbonitrile, or 1,2,3-tris(2-cyanooxy)propane.

9. The electrochemical device according to claim 3, wherein the electrolytic solution further comprises the lithium salt additive; the lithium salt additive comprises at least one of lithium bistrifluoromethanesulfonimide, lithium bis(fluorosulfonyl)imide, lithium bisoxalate borate, lithium tetrafluorophosphate oxalate, lithium difluorooxalate borate, lithium hexafluorocesium oxide, or lithium difluorophosphate.

10. The electrochemical device according to claim 3, wherein based on the total mass of the electrolytic solution, a content of the fluorocarbonates is 0.01% to 20%.

11. The electrochemical device according to claim 3, wherein based on the total mass of the electrolytic solution, the content of the fluorocarboxylate is 0.01% to 30%.

12. The electrochemical device according to claim 3, wherein based on the total weight of the electrolytic solution, the content of the sulfur-containing additive is 0.01% to 10%.

13. The electrochemical device according to claim 3, wherein based on the total weight of the electrolytic solution, the content of the nitrile-containing additive is 0.01% to 10%.

14. The electrochemical device according to claim 3, wherein based on the total weight of the electrolytic solution, the content of the lithium salt additive is 0.01% to 5%.

15. The electrochemical device according to claim 1, wherein the negative active material layer comprises a metal element, and the metal element comprises at least one of Co, Mn, Ni, Al, or Cu; based on the total weight of the negative active material layer, the content of the metal element is less than 200 ppm.

16. An electronic device, comprising an electrochemical device, wherein the electrochemical device comprises:
a positive electrode, wherein the positive electrode comprises a positive electrode current collector and a positive active material layer, and the positive active material layer comprises a positive active material;
a negative electrode, wherein the negative electrode comprises a negative electrode current collector and a negative active material layer, and the negative active material layer comprises a negative active material; and
an electrolytic solution, wherein the electrolytic solution comprises a lithium ion and an anion represented by Formula I;

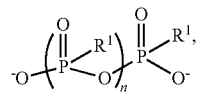
(I)

wherein
n is an integer in a range of 0 to 5; and
$R^1$ is selected from substituted or unsubstituted $C_1$-$C_{12}$ alkyls, substituted or unsubstituted $C_2$-$C_{12}$ alkenyls, substituted or unsubstituted $C_6$-$C_{20}$ aryls, and substituted or unsubstituted $C_1$-$C_{12}$ hydrocarbyloxys, wherein a substituent in the substitution is independently selected from a silyl, a siloxy, an amino group, an ether group, ester group, a carboxyl, a sulfonic acid group, a mercapto group, a cyano group, a halogen, or any combination thereof;
wherein, based on a total mass of the electrolytic solution, a content of the anion represented by Formula I is 2%-7%.

17. The electronic device according to claim 16, wherein the anion represented by Formula I comprises at least one of the following:

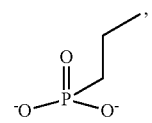
(I-1)

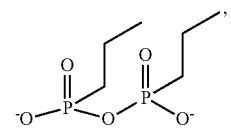
(I-2)

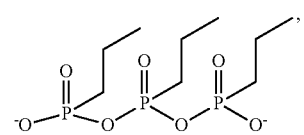
(I-3)

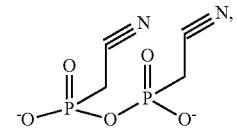
(I-4)

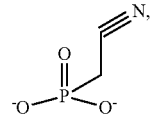
(I-5)

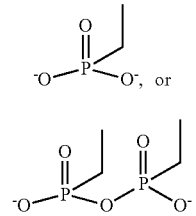
(I-6)

(I-7)

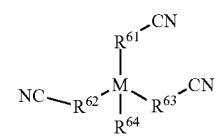

18. The electronic device according to claim 16, wherein the electrolytic solution further comprises one or more of a fluorocarbonate, a fluorocarboxylate, a sulfur-containing additive, a nitrile-containing additive, or a lithium salt additive.

19. The electronic device according to claim 18, wherein the nitrile-containing additive comprises at least one of the following compounds:

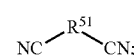
(II-A)

(II-B)

wherein M is selected from C or Si;
wherein $R^{51}$, $R^{61}$, $R^{62}$, $R^{63}$ are each independently selected from substituted or unsubstituted $C_1$-$C_{12}$ alkylidenes, substituted or unsubstituted $C_2$-$C_{12}$ alkenylenes, $R^0$—S—R groups, or $R^0$—O—R groups, wherein $R^0$ and R are each independently selected from substituted or unsubstituted $C_1$-$C_6$ alkylidenes; a substituent in the substitution is selected from halogens;

wherein $R^{64}$ is selected from H, substituted or unsubstituted $C_1$-$C_{12}$ alkylidenes, substituted or unsubstituted $C_2$-$C_{12}$ alkenylenes, $R^O$—S—R groups, or $R^O$—O—R groups, wherein $R^O$ and R each are independently selected from substituted or unsubstituted $C_1$-$C_6$ alkylidenes; a substituent in the substitution is selected from halogens.

* * * * *